Figure 1:
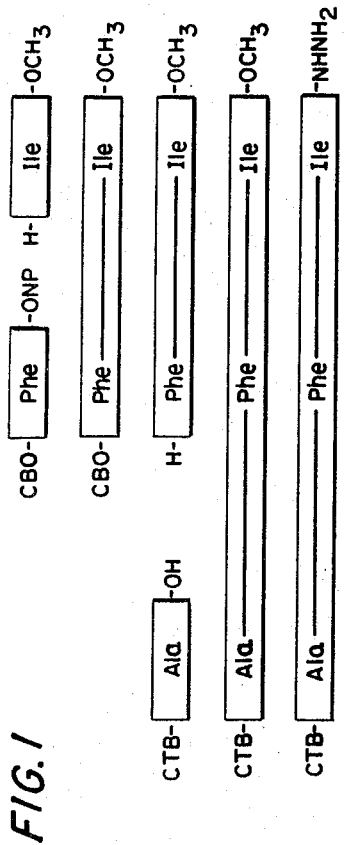
Figure 2:
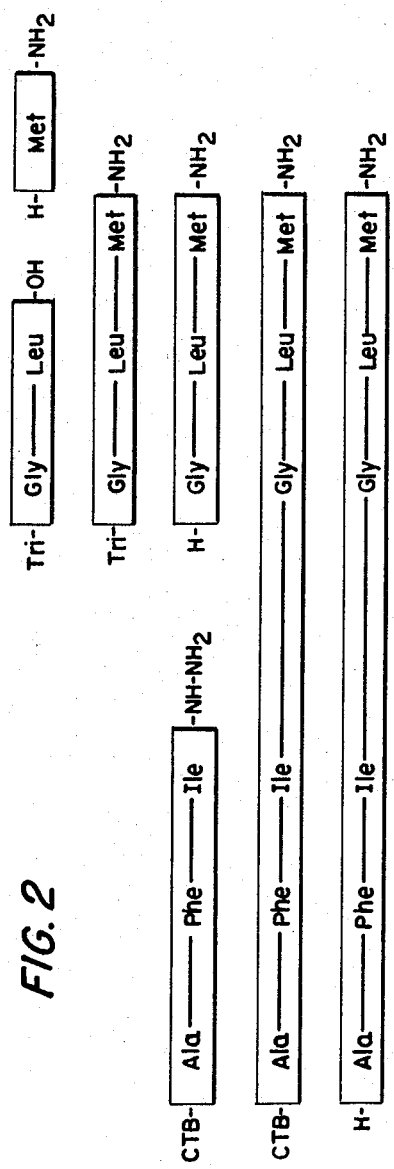
Figure 3:
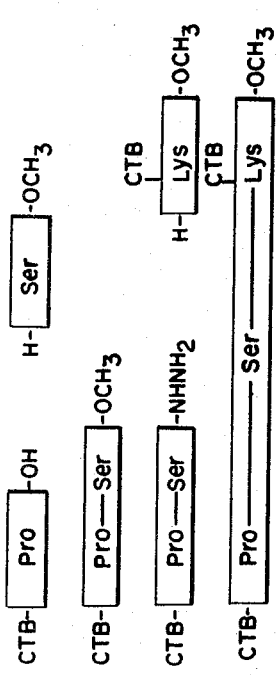
Figure 4:
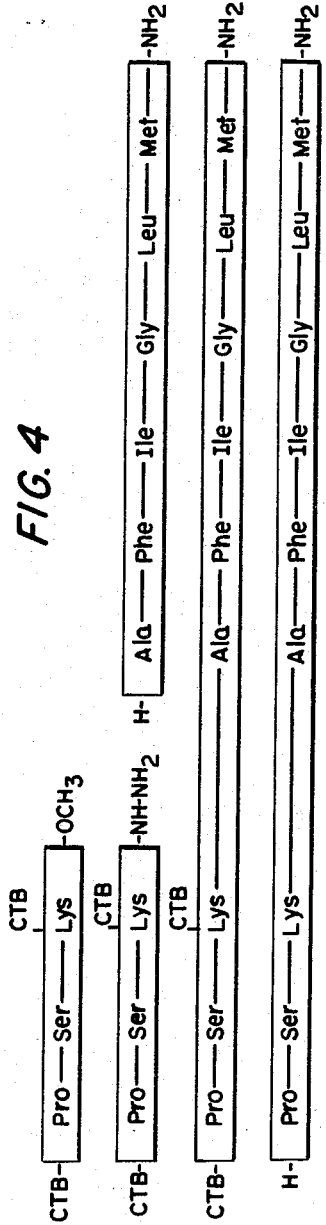

June 27, 1967    R. BOISSONNAS ETAL    3,328,382
L-PROLYL-L-SERYL-L-LYSYL-L-ALANYL-L-PHENYLALANYL
-L-ISOLEUCYL-GLYCYL-L-LEUCYL-L-METHIONINE AMIDE
Filed Dec. 2, 1963                    2 Sheets-Sheet 1

INVENTORS
ROGER BOISSONNAS
EDMOND SANDRIN
BY
ATTORNEY

United States Patent Office 3,328,382
Patented June 27, 1967

1

3,328,382
L - PROLYL - L - SERYL - L - LYSYL - L - ALANYL-
L - PHENYLALANYL - L - ISOLEUCYL - GLYCYL-
L - LEUCYL - L - METHIONINE AMIDE
Roger Boissonnas, Bottmingen, and Edmond Sandrin,
Basel, Switzerland, assignors to Sandoz Ltd., Basel,
Switzerland
Filed Dec. 2, 1963, Ser. No. 327,448
Claims priority, application Switzerland, Dec. 10, 1962,
14,450/62
2 Claims. (Cl. 260—112.5)

The present invention relates to a hitherto unknown nonapeptide, its salts.

The present invention provides L-prolyl-L-seryl-L-lysyl-L-alanyl-L-phenylalanyl-L-isoleucyl-glycyl-L - leucyl - L-methionine-amide and its acid addition salts. Suitable acids for acid addition salt formation are, for example, acetic, trifluoroacetic, p - toluene - sulfonic, tartaric, gluconic, maleic, malic, methanesulfonic and citric acids.

The said nonapeptide is shown in FIGURE IV of the accompanying diagrammatic drawings.

The following abbreviations are used in the text and in the drawings:

H-Pro-OH—L-proline
H-Ser-OH—L-serine
H-Lys-OH—L-lysine
H-Ala-OH—L-alanine
H-Phe-OH—L-phenylalanine
H-Ile-OH—L-isoleucine
H-Gly-OH—glycine
H-Leu-OH—L-leucine
H-Met-NH$_2$—L-methionine amide
CBO—carbobenzoxy
CTB—carbo-tert-butoxy
Tri—trityl
ONP—p-nitrophenyloxy
OMe—methoxy
OBz—benzyloxy The nonapeptide of the invention may be obtained by condensing L-prolyl-L-seryl-L-lysine, a new tripeptide, in which the ε-amino radical of the lysine radical is protected by a suitable protective group, the α-amino radical of the proline radical by a similar or different protective group and if desired the carboxyl radical of the lysine radical may be substituted by a radical which is capable of reacting with amino radicals, with L-alanyl-L-phenylalanyl-L-isoleucyl-glycyl-L-leucyl-L-methionine-amide, a hexapeptide, and removing the protective groups in one or more stages from the resulting L-prolyl-L-seryl-L-lysyl-L-alanyl-L-phenylalanyl-L-isoleucyl-glycyl-L-leucyl-L - methionine-amide of which the ε-amino radical of the lysine radical and the terminal α-amino radical of the proline radical are each protected by a suitable protective group.

Examples of suitable protective groups for the terminal α-amino radical of the proline radical are the carbobenzoxy, toluenesulfonyl, carbo-tert-butoxy, formyl, trifluoroacetyl and p-nitrocarbobenzoxy radicals. Examples of protective groups for the ε-amino radical of the lysine radical are the carbobenzoxy, toluenesulfonyl, carbo-tert-butoxy phthalyl, formyl, trifluoroacetyl and p-nitrocarbobenzoxy radicals. Examples of groups for the substitution of the carboxyl radical of the lysine radical capable of reacting with the terminal amino radical of the hexapep-

2 tide are the azide, p - nitrophenylester, 2,4,5 - trichlorophenylester, the asymmetrical anhydrides and the reaction product of the acid with dicyclohexylcarbodiimide.

The nonapeptide of the invention has a strong blood pressure lowering effect; this is stronger than that of L-pyroglutamyl-L-prolyl-L-seryl-L-lysyl - L - aspartyl - L-alanyl-L-phenylalanyl-L-isoleucyl-glycyl - L - leucyl - L-methionine-amide, a hendecapeptide. This last mentioned fact is surprising since the compound of the invention contains two amino acid radicals less than said hendecapeptide. The compound of the invention thus has a property which is useful in antihypertensives for the treatment of high blood pressure and for controlled blood pressure reduction, e.g. in surgery.

The vascular activity of the nonapeptide of the invention is useful in vasodilators for the treatment of circulatory disorders and spasms of the vascular system.

An alternative or additional possible use for the nonapeptide of the invention is as an agent for improving blood circulation in coronary vessels in the treatment of coronary spasms, attacks of angina pectoris and infarcts and as agent for stopping vaso spasms in the circulary area of the brain vessels; or as agent for promoting the passage of medicaments from the blood stream to the tissues.

If the nonapeptide of the invention is used as a therapeutic agent it may be in the form of a pharmaceutical preparation containing the said compound in admixture with an organic or inorganic carrier which is suitable for parenteral application. The pharmaceutical preparation may also contain one or more other therapeutically valuable substances.

It should be noted that the nonapeptide may be administered in the form of a depot preparation.

The invention thus also includes pharmaceutical preparations containing, in addition to an inert physiologically acceptable carrier, the nonapeptide of the invention or an acid addition salt thereof.

There is a large number of possible methods of synthesizing the nonapeptide of the present invention; one advantageous method may be effected as follows: N-carbobenzoxy-L-phenylalanine - p - nitrophenylester is condensed with L-isoleucine-methylester, the carbobenzoxy radical is split off and the resulting dipeptide ester is condensed with N-carbo-tert-butoxy-L-alanine. The resulting tripeptide ester, N-carbo-tert-butoxyl-L-alanyl-L - phenylalanyl-L-isoleucine-methylester, is converted into the azide via the hydrazide (see FIGURE I of the accompanying drawings). The azide is condensed with glycyl-L-leucyl-L-methionine-amide, which is obtained by condensation of N-trityl-glycyl-L-leucine with L-methionine - amide and splitting off the trityl radical. The resulting hexapeptide amide is converted into L-alanyl-L-phenylalanyl-L-isoleucyl-glycyl-L-leucyl-L-methionine-amide by treatment with trifluoroacetic acid (see FIGURE II of the drawings). N-carbo-tert-butoxy-L-proline is condensed with L-serine-methylester and the resulting N-carbo-tert-butoxy-L-prolyl-L-serine-methylester is converted via the hydrazide into the azide which is condensed with ε-N-carbo-tert-butoxy-L-lysine-methylester. The resulting N-carbo-tert-butoxy-L-prolyl-L-seryl-ε-N-carbo-tert-butoxy-L - lysine-methylester (see FIGURE III of the drawings) is converted via the hydrazide into the azide which is condensed with the above mentioned hexapeptide. Treatment of the protected nonapeptide with trifluoroacetic acid yields the biologically active nonapeptide (see FIGURE IV of the drawings) which, if desired, may be converted into an acid addition salt.

In the following example, which illustrates the invention, all temperatures are indicated in degrees centigrade. Procedure 1 describes the production of N-carbo-tert-butoxy - L - alanyl-L-phenylalanyl-L-isoleucine-methylester (cf. FIGURE I), procedure 2 the production of N - carbo - tert - butoxy - L - alanyl - L - phenylalanyl-L-isoleucine-hydrazide, procedure 3 the production of L-alanyl - L - phenylalanyl - L - isoleucyl-glycyl-L-leucyl-L-methionine-amide, procedure 4 the production of N-carbo - tert - butoxy - L - prolyl - L - seryl - ε - N - carbo-tert-butoxy-L-lysine-methylester and procedure 5 the production of L-prolyl-L-seryl-L-lysyl-L-alanyl-L-phenylalanyl - L - isoleucyl - glycyl - L - leucyl - L - methionine-amide.

EXAMPLE

*Procedure 1: CTB-Ala-Phe-Ile-OCH$_3$ (cf. FIG. I)*

168 g. of CBO-Phe-ONP and 58 g. of H-Ile-OCH$_3$ are dissolved in 1000 cc. of chloroform, left to stand over night at 20°, washed with water, dilute hydrochloric acid and aqueous sodium bicarbonate, dried over sodium sulfate, evaporated in a vacuum and ethyl ether added to the residue. 130 g. of CBO-Phe-Ile-OCH$_3$ (melting point 106°) crystallize and are dissolved in 1100 cc. of a 3.5 N solution of hydrogen bromide in glacial acetic acid. After one hour at 20° it is evaporated in a vacuum, ethyl ether added, the crystallized product dissolved in 600 cc. of chloroform and 43 cc. of triethylamine, 65 g. of dicyclohexylcarbodiimide and 59 g. of CTB-Ala-OH added. It is left to stand over night at 0°, filtered, the solution washed with water, dilute hydrochloric acid and aqueous sodium bicarbonate, dried over sodium sulfate, evaporated in a vacuum and petroleum ether added to the residue. 105 g. of CTB-Ala-Phe-Ile-OCH$_3$ crystallize (melting point 50°; $[\alpha]_D^{20}=-20°$ in 95% acetic acid).

*Procedure 2: CTB-Ala-Phe-Ile-NH-NH$_2$ (cf. FIG. I)*

105 g. of CTB-Ala-Phe-Ile-OCH$_3$ and 200 g. of hydrazine hydrate are dissolved in 1000 cc. of methanol. After 4 days at 20°, it is evaporated in a vacuum, the residue dissolved in 300 cc. of water, brought to a pH of 7.5 with 4 N hydrochloric acid, cooled to 0° and filtered. 55 g. of CTB-Ala-Phe-Ile-NH-NH$_2$ are obtained (melting point 250° with decomposition) (after previous heating above 100°) $[\alpha]_D^{21}=-23°$ in dimethylformamide.

*Procedure 3: H-Ala-Phe-Ile-Gly-Leu-Met-NH$_2$ (cf. FIG. II)*

129 g. of Tri-Gly-Leu-OH, 45 g. of H-Met-NH$_2$ and 65 g. of dicyclohexylcarbodiimide are dissolved in 1300 cc. of methylene chloride, left to stand over night at 0°, filtered, the solution washed with dilute hydrochloric acid and aqueous sodium bicarbonate, dried over sodium sulfate, evaporated in a vacuum and ethyl ether added. 112 g. of Tri-Gly-Leu-Met-NH$_2$ are obtained (melting point 212°; $[\alpha]_D^{21}=-4°$ in dimethylformamide) and are left to stand in a mixture of 600 cc. of glycial acetic acid and 600 cc. of water for 20 minutes at 90°, then cooled to 20° and filtered. The solution is evaporated in a vacuum, the residue washed with ethyl ether and crystallized from methanol-ether. 62 g. of H-Gly-Leu-Met-NH$_2$ acetate are obtained (melting point 130° with decomposition; $[\alpha]_D^{21}=-35°$ in 95% acetic acid) and a solution added which is produced by dissolving 72 g. of CTB-Ala-Phe-Ile-NH-NH$_2$ in 300 cc. of 2 N hydrochloric acid and 900 cc. of dimethylformamide at −5° and adding 85 cc. of 2 N sodium nitrite and after 5 minutes 85 cc. of triethylamine and 600 cc. of dimethylformamide. It is left to stand over night at 0°, evaporated in a vacuum, the residue washed with cold, dilute hydrochloric acid, dissolved in tetrahydrofuran and precipitated by the addition of water. 75 g. of CTB-Ala-Phe-Ile-Gly-Leu-Met-NH$_2$ are obtained (melting point 250°; $[\alpha]_D^{21}=-30°$ in dimethylformamide), which are dissolved in 2000 cc. of trifluoroacetic acid and left to stand for one hour at 28°. It is evaporated in a vacuum, dissolved in methanol, 16 cc. of tri-n-butylamine added and precipitated with ethyl ether. 60 g. of H-Ala-Phe-Ile-Gly-Leu-Met-NH$_2$ are obtained (melting point 250° with decomposition; $[\alpha]_D^{22}=-20°$ in 95% acetic acid).

*Procedure 4: CTB-Pro-Ser-Lys(CTB)-OCH$_3$ (cf. FIG. III)*

86 g. of CTB-Pro-OH, 62 g. of H-Ser-OCH$_3$.HCl, 56 ml. of triethylamine and 86 g. of dicyclohexylcarbodiimide are dissolved at 0° in 600 cc. of chloroform, left to stand over night at 0°, filtered, evaporated in a vacuum, ethyl ether added, filtered and petroleum ether added to the solution. 102 g. of CTB-Pro-Ser-OCH$_3$ are obtained, which are dissolved in 1100 cc. of methanol and 220 cc. of hydrazine hydrate at 0°. After 3 days at −20° it is evaporated in a vacuum, dissolved in methanol and ethyl ether and petroleum ether added. 79 g. of CTB-Pro-Ser-NHNH$_2$ are obtained (melting point 80°; $[\alpha]_D^{22}=-75°$ in 95% acetic acid), which are dissolved in 750 cc. of N hydrochloric acid at −5°. 270 cc. of N sodium nitrite are added and after 10 minutes solid sodium carbonate and the resulting azide is extracted with ethyl acetate at −5°. The organic solution is dried with sodium sulfate and 71 g. of H-Lys(CTB)-OCH$_3$ are added. After 10 hours at 0° and 3 days at 20° it is washed with dilute hydrochloric acid and aqueous sodium bicarbonate, dried over sodium sulfate, evaporated in a vacuum, the residue dissolved in ethyl ether and petroleum ether added. 95 g. of CTB-Pro-Ser-Lys(CTB)-OCH$_3$ are obtained (melting point 60° with decomposition; $[\alpha]_D^{22}=-56°$ in 95% acetic acid).

*Procedure 5: H-Pro-Ser-Lys-Ala-Phe-Ile-Gly-Leu-Met-NH$_2$ (cf. FIG. IV)*

80 g. of CTB-Pro-Ser-Lys(CTB)-OCH$_3$ are dissolved in 750 cc. of methanol, 200 cc. of hydrazine hydrate added, left to stand over night at 20°, evaporated in a vacuum, dissolved in 900 cc. of methanol and 5000 cc. of ethyl ether added. 59 g. of CTB-Pro-Ser-Lys(CTB)-NH-NH$_2$ crystallize (melting point 160°; $[\alpha]_D^{21}=-58°$ in 95% acetic acid), which are dissolved in 440 cc. of N hydrochloric acid and 880 cc. of dimethylformamide; 60 cc. of 2 N sodium nitrite are added at −5° and after 5 minutes 82 cc. of triethylamine and 57 g. of H-Ala-Phe-Ile-Gly-Leu-Met-NH$_2$. It is left to stand overnight at 0°, evaporated in a vacuum and the residue washed with ethyl ether and dilute acetic acid. 75 g. of nonapeptide are obtained (melting point 260° with decomposition; $[\alpha]_D^{20}=-50°$ in 95% acetic acid), which are dissolved in 2000 cc. of trifluoroacetic acid. It is left to stand for one hour at 25°, evaporated in a vacuum, the residue washed with 1000 cc. of water which is brought to a pH of 6.5 by the addition of sodium bicarbonate. 57 g. of H-Pro-Ser-Lys-Ala-Phe-Ile-Gly-Leu-Met-NH$_2$ are obtained in the form of a powder which is difficultly soluble in neutral water. ($[\alpha]_D^{20}=-73°$ in 95% trifluoroacetic acid. Melting point 220° with decomposition). By means of acid hydrolysis in an atmosphere of nitrogen it yields proline, serine, lysine, alanine, phenylalanine, isoleucine, glycine leucine methionine and ammonia in equimolecular quantities. The free peptide may be dissolved in water by the addition of an equivalent of an acid. The corresponding salt is obtained by evaporation.

What is claimed is:

1. A compound selected from the group consisting of L - prolyl - L-seryl-L-lysyl-L-alanyl-L-phenylalanyl-L-isoleucyl-glycyl-L-leucyl-L-methionine amide and its pharmaceutically acceptable acid addition salts.

2. L - prolyl - L - seryl - L - lysyl - L - alanyl - L-phenylalanyl - L - isoleucyl-glycyl-L-leucyl-L-methionine amide.

(References on following page)

References Cited

UNITED STATES PATENTS

| | | | |
|---|---|---|---|
| 2,766,225 | 10/1956 | Kenner | 260—112.5 |
| 2,786,049 | 3/1957 | Lundgren | 260—112.5 |
| 3,198,705 | 8/1965 | Cummings | 167—65 |
| 3,203,860 | 8/1965 | Wu et al. | 167—65 |
| 3,268,502 | 8/1966 | Lubke et al. | 260—112.5 |
| 3,272,790 | 9/1966 | Bernardi et al. | 260—112.5 |

OTHER REFERENCES

Bernardi et al.: Experientia 20, 306–309 (1964).

Sandrin and Boissonnus: Helv. Chim. Acta. 47, 1294–1307 and 1332 (1964).

Schroder and Lubke: The Peptides, vol. II, New York, Academic Press, 1966, pp. 127–156.

Stuermer et al.: Experientia 20, 303–306 (1964).

LEWIS GOTTS, *Primary Examiner.*

JULIAN S. LEVITT, *Examiner.*

LEROY B. RANDALL, MELVYN M. KASSENOFF,
*Assistant Examiners.*